United States Patent [19]
Layden et al.

[11] Patent Number: 5,560,006
[45] Date of Patent: Sep. 24, 1996

[54] ENTITY-RELATION DATABASE

[75] Inventors: John E. Layden; David J. Layden, both of Indianapolis; Thomas A. Pearson, Fishers, all of Ind.

[73] Assignee: Automated Technology Associates, Inc., Indianapolis, Ind.

[21] Appl. No.: 436,786

[22] Filed: May 8, 1995

Related U.S. Application Data

[63] Continuation of Ser. No. 922,491, Jul. 30, 1992, abandoned, which is a continuation-in-part of Ser. No. 700,548, May 15, 1991, Pat. No. 5,339,257.

[51] Int. Cl.$^6$ ................................................. G06F 17/30
[52] U.S. Cl. .............. 395/600; 364/222.81; 364/243.41; 364/251.6; 364/254.6; 364/282.1; 364/974; 364/DIG. 1; 364/DIG. 2; 395/412
[58] Field of Search ..................................... 364/489, 490, 364/282.1; 395/600, 412

[56] References Cited

U.S. PATENT DOCUMENTS

| | | | |
|---|---|---|---|
| 4,644,480 | 2/1987 | Haruna et al. | 364/552 |
| 5,036,473 | 7/1991 | Butts et al. | 364/489 |
| 5,043,885 | 8/1991 | Robinson | 364/DIG. 1 |
| 5,230,048 | 7/1993 | Moy | 395/600 |
| 5,263,160 | 11/1993 | Porter et al. | 395/600 |
| 5,319,778 | 6/1994 | Catino | 395/600 |
| 5,333,318 | 7/1994 | Wolf | 395/600 |
| 5,339,257 | 8/1994 | Layden et al. | 395/552 |

OTHER PUBLICATIONS

Physical design equivalencies in database conversion; Gillenson, Mark L., Communication of the ACM, V33, n8, p. 120(12); Aug., 1990.
Storey and Goldstein, "A Methodology for Creating User Views in Database Design", ACM Transactions on Database Systems, vol. 13, No. 3, Sep. 1988, pp. 305–338.

*Primary Examiner*—Thomas G. Black
*Assistant Examiner*—Hosain T. Alam
*Attorney, Agent, or Firm*—Locke Reynolds

[57] ABSTRACT

An entity-relation database is disclosed to include a plurality of entity fields containing arrays of data elements, the data elements being related to each other in predefined sets, with each predefined set including data elements in at least two of the entity fields. At least one linked list defines the relationship between data elements between each of the predefined sets and provides a means for retrieving all of the elements of any selected predefined set from the two entity fields. The linked list consists of two distinct portions, namely, a head portion associated with each member of one entity field and a continuation portion associated with each member of another entity field, while each entry consists of a pair of addresses thereby forming a doubly linked list.

31 Claims, 2 Drawing Sheets

Microfiche Appendix Included
(6 Microfiche, 576 Pages)

ENTITY-RELATION DATABASE

CROSS-REFERENCE TO RELATED APPLICATIONS

This application is a continuation of Ser. No. 07/922,491, filed on Jul. 30, 1992, now abandoned, which is a continuation-in-part of Ser. No. 07/700,548 filed on May 15, 1991, now U.S. Pat. No. 5,339,257 entitled Real-Time Statistical Process Monitoring System which is hereby incorporated by reference. A microfiche appendix of a computer program in accordance with the invention is attached. Six microfiche collectively having a total of 576 frames are included in the appendix.

BACKGROUND OF THE INVENTION

This invention relates to computer database systems generally and more particularly to computer database systems for use in process monitoring of various manufacturing operations, and the like. The invention particularly relates to such systems which seek to store and retrieve in a coordinated fashion sets of data within predetermined time constraints on either an as-requested basis or on a continuous event driven basis.

Database systems generally comprise a collection of data stored in various files, records, and fields, together with certain dictionaries, indexes, and the like, to permit quick and easy storage and access of the information within the database. In most contemporary database systems, each type or class of data is stored in a separate file with an appropriate index such that the logical intersection of the data from two separate files may be examined by asking an appropriate query of the database. The computer system then examines each database in turn, extracting the required information from each database, which extracted information is then assembled in a correlated fashion for presentation in response to that inquiry. As a general rule, the time for response to the query is directly related to the number of files which have to be examined or searched for the information and the length of each file. If the files are indexed or otherwise ordered in a sequence based on a criteria of the data stored in the file, then the access time can be reduced significantly within each file. Nevertheless, the coordination of the data from several files will still depend on a need to examine each file in order to retrieve the necessary information.

The storage of information in such general database files is also related to their size and structure. While it is readily apparent that data could quickly be added to any file in random order, in the absence of some indexing method, retrieval of that same data from that file would require an examination of the entire file. If, on the other hand, either the file itself is organized in some sequential or an index is provided which allows the sequential order of the file to be established, then the time to enter data into the appropriate location or generate the appropriate index necessarily increases the time necessary to enter information into the file. As a general rule, the data itself is rarely placed in an ordered arrangement while the use of indexing arrangements is widely used. Nevertheless, the index in each given file is generally separate from and has no relationship to any other file maintained by the database at the same time and thus the correlation of information from two files requires an independent search of each of the indexes employed in each of the files into which access is required in order to retrieve information from multiple files.

The need to generate multiple indexes in order to deposit related information into multiple files of a single database and, perhaps more importantly, the need to search multiple indexes in order to retrieve related information from multiple files of a single database significantly slows the operation of a database. While in most circumstances such access and retrieval delays are tolerable, they cannot be tolerated in data processing systems which are employed in real time critical path problems such as process monitoring systems employed in connection with various manufacturing operations. That is, it is necessary that any computer based process monitoring system used for monitoring a manufacturing operation must at all times be able to operate faster than the underlying manufacturing operation which it is tasked to monitor. From a practical point of view, manufacturers cannot tolerate a situation where a manufacturing process is being slowed as a result of the inability of a computer to keep up with the informational requirements of that manufacturing process.

Thus a central problem sought to be solved by the present invention is the development of a database which can in each and every circumstance complete a data access and retrieval operation which, even under the worst case, operates within a well-defined and known upper limit of time which upper limits can be employed to ensure that all necessary data recording and analysis can be achieved within the time constraints imposed by the external manufacturing process which the system is monitoring. It will be readily appreciated of course that such a database organization has wide utilization even beyond manufacturing process monitoring and has particular utility in any circumstance where it is desirable that a database be sufficiently fast to operate within the time constraints of events external to that database so long as they are not beyond the capacity of the computer hardware in which the database management system is installed which is of course always a limiting factor.

SUMMARY OF THE INVENTION

A database in accordance with the present invention includes as a basic organizational structure all of the data relationships as well as the data itself and, as a result, is referred to as an entity-relation database. Such an entity-relation database generally comprises a plurality of entity fields containing arrays of data elements, the data elements being related to each other in predefined sets, each predefined set including data elements in at least two of the entity fields. At least one linked list which defines the relationship between data elements between each of the predefined sets and provides a means for retrieving all of the elements of any selected predefined set from the two entity fields. The linked list consists of two distinct portions, namely, a head portion associated with each member of one entity field and a continuation portion associated with each member of another entity field, while each entry consists of a pair of addresses thereby forming a doubly linked list.

In the head portion, each entry associated with each member of a first entity field contains an address of a first element and an address of a last element, the first and last elements both being present in a second entity field and being related to the member of the first entity field. If there are no elements of the second entity field which are related to a particular element of the first entity field, then both addresses will be null. If there is only one element in the second entity field associated with the element in the first entity field and the address for both the first and last element will be the same. Where there are more than one related element in the second entity field, the first and last element addresses will of course be different. In no circumstance will there be either more than or less than two addresses in the head portion of the linked list associated with each member of the first entity field.

In the continuation portion, there are likewise provided two addresses associated with each member of the second entity field. One address is for the next element in the second entity field which is related in a similar manner to the same data element in the first entity field while the second address is for the previous element in the second entity field also related to the same element in the first entity field. It will be appreciated that the string of next and previous addresses defines an address loop within the second entity field containing all of the related elements in that field. Further, since the pair of addresses associated with each member of the second entity field includes both the next element and the previous element, this loop of data elements can be traversed in either of two reciprocal orders starting with either the first or last element identified by the address found in the head portion of the linked list. This deterministic addressing of related elements of predefined sets of data included in two different entity fields permits the retrieval of all related data by conducting only a single search of one of the two data fields in order to retrieve a complete set of related data. It will be appreciated that each data element of a given field can include any number of address pairs belonging to any number of head portions of linked lists. On the other hand, each data element can only include a single pair of address pairs from a continuation portion of the linked list.

In order to provide for multiple addressing to a given data element in a given entity field, an entity-relation database in accordance with the present invention can also contain at least one pointing field containing an addressable array of addresses of at least some of the data elements in an entity field. As such, the pointing field constitutes an indirect addressing of data elements in the given entity field, a head portion of a linked list associated with each member of a second entity field contains address for a first and last element of the pointing field pointing to related elements in the first entity field. The continuation portion of the linked list is associated with each member of the pointing field and contains addresses of each next and previous element of the pointing field which points to related elements in the first entity field which are related to the given element in the second entity field. The linked list linking the pointing field to elements in a second entity field permits retrieval of all related elements in the first entity field even where the elements in the first entity field relate to more than one element in the second entity field. Like the previously described linked list, the linked list related to the pointing field permits retrieval of related data elements from the selected entity field in either of two reciprocal orders defined by the linked list. Further, any number of linked lists coupled with pointing fields can effectively point to the same set of elements in any given entity field.

It will be appreciated that in both circumstances the linked lists may be viewed as a series of independent loops which stitch together related data appearing in any number of databases. For each linked list, the integrity of the individual entries can be checked by merely comparing the sum of the first and next addresses with the sum of the last and previous addresses within each linked list. If this sum is not equal, then the linked list is incorrect due to an address error. The sequence of addresses within each loop can then be checked to identify any inconsistency in addressing inasmuch as each linked list provides two loops for each related set of data.

Upon identification of a pair of loops containing an inconsistent address, the content of the two inconsistent addresses can be analyzed. Since the addresses can reasonably take on any number of values and most erroneous address values would lead to a non-sensical data element, self correction of the linked lists is usually possible. Where, from an analysis of the data present at the inconsistent addresses, a resolution of the proper address is not possible, then intervention into the system would be required.

The use of the double-linked list for mapping relationships between data allows for a very simple deterministic process to be used for either the entry or deletion of data elements referred to by such linked lists, the number of steps employed being fixed and not dependent on the length of the link list involved. The use of the double-linked list and pointing fields allows for a database to be constructed containing no redundant data. While the database avoids the use of redundant data, it will be appreciated that the significantly larger volume of the database is employed in specifying the relationships between data elements in the database.

The predefinition of relationships between data elements appearing in various entity fields of the database allows for considerable time savings and retrieval of information from the database since only a single search is required. The data retrieval time is now determined by the indexing and search method employed to access the initial element of the predefined set. In accordance with the present invention, each of the entity fields containing data elements forming the route or basis for a data inquiry as rationalized by providing an index ordering the data by a selected characteristic of the data elements within the indexed entity field. That is, data in the form of discreet positive integers would be indexed so as to be retrievable in numerical order, text information would be indexed so as to be retrievable in alphabetic order, etc.

Additionally, the search mechanism employed for searching the index for the selected element is binary in nature so that a series of inquiries is made of the index and at each inquiry the search is constrained to only that half of the index known to contain the element desired to be retrieved. Thus, the time "T" to retrieve a desired data element from a field even in the worst case is determined by the equation $$T = K \log_2 n,$$

where "n" is the size of the field containing the desired data element and "K" is a proportionality constant determined by the hardware in which the entity-relation database of the present invention is installed. The use of such a binary search scheme in an entity-relation database of the present invention assures retrieval of all related data for a given inquiry in an identifiable amount of time which time constraints can then be employed to specify the hardware system constraints in relationship to the underlying manufacturing process or other event driven critical data needs to which the database is to be employed. It will also be understood that the time for insertion and deletion of data in the system is proportional to n, namely, is about the same as the search time, namely, $$T \cong Kn$$

Thus, the entity-relation database in accordance with the present invention provides for a deterministic performance for all operations of the database.

It will be appreciated that where the number of entries "n" in any given entity field becomes very large, the insert/delete time of such an indexed entity field might exceed the allowable time as determined by the external events to which the database is operationally connected. In such circumstances, an alternative indexing scheme can be employed wherein the indexing means comprises a searchable network of integers arranged in groups of three integers for each of the data elements in an entity field indexed in such a manner. One of the three integers specifies that index integer of a parent data element of the same entity field. Each of the two remaining integers specifies the index integer of any immediately dependent data elements of the same entity field, the network of integers mapping the data elements into an inverted binary tree, where each layer in the tree structured contains twice as many elements as the preceding layer. Insertion and deletion of data in the modified binary tree is proportional to n, being about the same as the search time, $T \cong Kn$. When so indexed, searching is conducted by initiating the search at the root of the tree and following the path defined by the integers specifying the dependent data elements to the desired element. While the time required access a given desired element within a field using such indexing may actually be somewhat slower than a binary search of simply a linear sort index, the time for adding or deleting the desired element from the database is significantly shorter (approximately $T=K \log_2 n$) since the number of changes to the binary tree index is proportional to n, thus again leading to a predictable time management tool for use in planning of an event-driven database system.

An entity-relation database in accordance with the present invention is preferably maintained in such memory devices as will permit access in the shortest possible period of time. While it is preferred that the entirety of the database would be maintained available in the CPU memory of the selected computer in which the database is installed, it will be appreciated that through the use of virtual memory mechanisms, portions of the database may be stored in fast access memory devices which will provide only minimal delays in access time. It is desirable, however, that a back up scheme be provided so that in the event of system failure the database can quickly be reconstructed.

A preferred means for providing a back up record of the database includes a permanent record storage means such as a disk or tape system for storing a permanent record of the database. A cache is provided which is connected to the permanent record storage means. The cache being divided into at least two portions. The cache is connected to a logging means which logs to the cache each transaction occurring in the database which causes a change in at least one data element within the database. For those transactions which cause no change in the underlying database, such as an inquiry retrieval, no logging need occur. Means is provided for flushing the contents of a given portion of the cache to the permanent record storage means upon the filling of the one portion of the cache while allowing logging to another portion of the cache.

As a practical matter, in most circumstances, the cache need contain only two portions. Means is provided for preventing any changes to the underlying database if no portion of the cache is available to receive logging of a database transaction. The back up record provided in the permanent record storage means by the periodic flushing from the cache provides a means for reconstructing the database up to and including the last completed flushing operation from the cache at any instant in time. In the event of system failure, the only lost data will be that found in the unfilled portion of the cache. The size of the cache portions can be selected based on estimated data activity so as to minimize the possible loss of data while at the same time providing ample time for flushing to occur. The use of the cache flushing to a permanent record can be combined with more standard back up schemes so as to provide appropriate redundancy of the back up if desired.

Additional features and advantages of the present invention will become apparent to those skilled in the art upon the following description of a preferred embodiment of the invention exemplifying the best mode of carrying out the invention as presently perceived. The detailed description particularly refers to the accompanying tables and drawings.

BRIEF DESCRIPTION OF THE TABLES AND DRAWINGS

Table A shows the contents of a representative entity field including an address and sort index.

Table B shows a second entity field owned by the entity field of Table A.

Table C shows a pointing field relating the entity field shown in Table A to yet another entity field.

Table D shows an entity linked list giving the inverse relation to that shown in Table C.

Tables $D_1$ and $D_2$ show the steps taken in the addition and deletion of data from Table D.

Table E shows the combination of a linked list and pointing list to relate the entity field of Table A to yet another Entity field.

Table F shows another combination of linked list and pointing list to define the inverse relation to that given in Table E.

Table G shows the concatenation of Tables E and F.

Table H shows an alternative indexing for the entity field of Table A.

Table $H_1$ shows the addition of a data element to the entity filed and its effect on the two different indexes.

DESCRIPTION OF THE PREFERRED EMBODIMENT

The entity-relation database of the preferred embodiment is constructed to contain two different types of data-receiving fields referred to generally as entity fields. The two different kinds of entity fields containing arrays of data elements are called "key fields" and "item fields". Key fields are fields which contain an array of data entries each of which is unique. In a entity-relation database of the preferred embodiment, all key fields are sorted or indexed as the entries are made into the field. Thus the entries of a key field form at all times an ordered array similar to a flat file which can quickly be searched using a binary search process to locate the desired entry without having to read all the entries in the field. An example of a key field is one containing a list of the serial numbers assigned to the articles of a particular manufacturing process. Since no two articles of the same process have the same serial number, it follows that the field containing the list of the serial numbers is one in which each entry is unique.

Another example of a key field is entity field #1 as shown in Table A containing a list of makes of automobiles. It is be to noted that while the data elements of the field are not ordered within the field, a sort index is provided which orders the data elements of the field based on a characteristic of the data elements, namely, their alphabetic order. It is to be understood that another characteristic of the data elements, such as word length, could be chosen if so desired. Only arrays of data elements which are capable of some sort of ordered arrangement can form key fields, but the data elements can be information of any type what so ever including merely a list of memory addresses.

An item field, on the other hand, is one which contains entries which are not necessarily unique. Since item fields can contain entries which are duplicates of other entries in that same field, retrieval access to the information in an item field must be through another field, which other field is said to own the item field. An example of an item field is one containing a list of all the model numbers of parts produced in the order of their production where a multitude of parts carrying each model number is manufactured. Such an item field could be accessed, for example, by way of another field containing merely time/date entries reflecting the time and date of completion of the parts. Another example of an item field is entity field #2 shown in Table B which gives the corporate manufacturer of each of the makes of automobiles listed in entity field #1. Entity field #2 is owned by entity field #1 and is accessed through that field. Again, an item field could be nothing more than an array of addresses of other data entries where the addresses given can contain duplicates.

An entity field containing an array of addresses, whether structured as a key field or as a item field has particular use in an entity-relation database of the preferred embodiment, and is referred to as a pointing field. A pointing field is a relationship defining field. The function of "pointing" implies that a one-to-one or a one-to-many relationship exists between a pointing field and another field. A given pointing field can only point to a single other field, not to two or more. On the other hand, a given field can be pointed to by many other fields. An example of a pointing field is shown in Table C which shows pointing field 1-3, which is owned by entity field #1, pointing to the addresses of the various data elements of entity field #3.

In the entity-relation database of the preferred embodiment, all entities are related to each other by relationships defined at the time of establishing the database. There are two fundamental kinds of relationships, namely, a one-to-one relationship and a one-to-zero or more relationship (which can also be thought of as a one-to-many relationship, where "many" can have any value including zero). In addition to the direct relationships, chain relationships are also implied. That is, if entity field A has a one-to-one relationship with entity field B, and entity field B has a one-to-one relationship with entity field C, then it is implied that entity field A has a one-to-one relationship with entity field C. The entity fields are organized by relationship defining fields into a logical structure which allows query paths to be built into the structure. Once the relationships are defined, the data entered into the database is quickly and easily accessed. One relationship between fields which is not permitted in an entity-relation database of the present invention is a so-called "many-to-many" relationship, because it simply fails to have sufficient information to permit the type of information retrieval required of such a system.

To accomplish the ready data retrievability actually required in an event-driven entity-relation database system according to the present invention it is desirable to also use an additional relationship defining field to construct the desired data query paths. The additional relationship defining fields are in the form of linked lists which correlate the entries in two other fields, which may be entity fields or other relationship defining fields. All linked lists are internally organized as "doubly-linked lists", with the values being inserted in each of the doubly-linked lists in such a fashion that retrieval of the relationship information may be obtained in either direction. The linked lists thus constitute indirect addressing for each entry in two other fields, which may be entity fields or other relationship defining fields.

The linked lists are composed of a head portion and a continuation portion. The head portion is owned by a first field and points to a second field, while the continuation portion is owned by the second field and points to other elements in the second field. An example of a linked list is shown in Table D wherein the manufacturers listed in entity field #3 are linked to the various makes of automobiles they manufacture listed in entity field #1 by entity linked list 3-1. The head portion of entity linked list 3-1 is seen to comprise a pair of numbers for each entry in entity field #3. The numbers listed in column F points to the address of the first member of entity field #1 which is related to the given entry in entity field #3. The numbers given under column L give the address of the last data element in entity field #1 related to the given data element in entity field #3. Where there exists only a single member in entity field #1 which is related to the element in entity field #3, the numbers appearing in both column L and column F are the same, for example as shown under the entry for item 4 of entity field #3. Where there is more than one data entry in entity field #1 related to the data element in entity field #3, the numbers appearing in columns L and F are different from each other and represent the first and last member of the group of related data elements existing in field #1. In order to find the remaining elements, it is necessary to go to the continuation portion of the entity linked list.

The continuation portion of the linked list can be considered to be owned by the entity field #1 and gives the address within entity field #1 of the next and previous elements which are related to the same element of entity field #3. For example, entity field #3 lists General Motors as a manufacturer and specifies that the first member of the related data elements in entity field is found at address 6. At address 6 in entity field #1, we find the data element "Buick" together with the indication that the next related data element is to be found at address 8. At address 8, appears the data entry "Cadillac" and in the continuation list, the next entry is listed as 3. Under address 3, the data entry is "Chevrolet" and the next entry given in the continuation list is address 4. At address 4, we find the data entry "Corvette" and in the related continuation list, the identification of the next entry to be at address 11. At address 11, we find the data entry "Pontiac" and in the related entry in the continuation list, we find the next address 15. At address 15, we find the entry "Oldsmobile" and in the continuation list, we find the entry "0". This zero entry symbolizes the end of the list. Thus the list of all makes of automobiles manufactured by General Motors has been generated by following the addresses listed in the F column of the head and the N column of the continuation of the linked list.

This same list can be generated in reverse order by looking at the entries under columns L and P in the head and continuation of the linked list, respectively, where L stands for the last item of the list and P stands for the previous item in the list. That is, the last item given under General Motors in the head of the linked list is address 15 which in entity field #1 reveals the data entry field #1 reveals the data entry "Oldsmobile" and in the related continuation list gives the address 11. At address 11 is the data entry "Pontiac" and the related continuation address under the P column of 4 and so forth. Thus, the linked list may be viewed as two loops extending from a single entry in entity field #3 over to all of the related entries in entity field #1 which strings together like beads on a string related data elements in the two entity fields. Furthermore, the order of elements on the string is seen to be given by following the numbers which, for General Motors, is 6, 8, 3, 4, 11 and 15. Following the same series using the last and previous numbers one achieves the series 15, 11, 4, 3, 8 and 6. It will be quickly realized that these two number series are opposite from each other and can be employed to check the integrity of the linked list. Furthermore, if one sums together all of the addresses given in the last and previous columns and all of the addresses given in the first and next columns, both sums should be the same since each address, with the exception of the zero address appears only once. The sum E of all such addresses is given by:

$$\Sigma=n(n+1)/2,$$

where "n" is the number of addresses in the entity field referred to by the linked list. This information can also be used to check to make sure that the linked list is not in error. It is to be noted that the linked list is constructed such that the order of entries retrieved from entity field #1 is in a predetermined order. In the example shown, the order is alphabetic but could be any other order specified.

A key feature of such linked lists is found upon examining the process of adding or deleting data from the entity field to which the linked list refers. Table $D_1$ shows the addition of the data entry "Edsel" at address 16 in entity field #1. Such an addition is accompanied by the substitution of this new last member address in column L associated with data element 2 of entity field #3 and the substitution at the address previously given at that location in column N of the address of the newest item. The value previously found, namely address 10 is listed in column P for item 16 of entity field #1, and since it is the last related item, the number zero appears under column N. The addition of the data element at address 16 changes the check sum from the previous value of 120 to the new value of 136.

The deletion of an item is shown in Table $D_2$ showing the deletion of item 2 from entity field #1. Such a deletion requires substituting the address previously appearing in the columns P and N for the deleted item at the locations in the continuation of the linked list where the address of the deleted item previously appeared. Further, a value is inserted in columns P and N in the location of the deleted item indicating that there is a space in the entity field at that location. The value to be substituted is equal to $-(n-j)$, where n is the highest address given in entity field #1 and j is the address of the deleted item. Further, the check sum is now modified to reflect a lower total number of items in entity field #1.

It will be appreciated that both the addition and deletion of items from entity field #1 is accomplished through a finite series of steps by changes to the linked list which is achievable in a discernable amount of time and requires essentially no searching in order to accomplish such addition or deletion. Further, the number of steps involved in such addition or deletion is unrelated to the length of the entity field or linked list.

While the illustrated linked list directly relating entity field #3 to entity field #1 is satisfactory where there is a one-to-one relationship between the members of the field, such a linked list is not satisfactory where there is a one-to-many relationship. In that circumstance, it is necessary to employ a linked list together with a pointing list to satisfactorily relate the two entity fields. An example of such a linked pointing list is found in Table E where the entity field #1 giving the makes of the various automobiles is related to entity field #4 which gives the models of various types of automobiles. The linked pointing list 1-4 establishes the relationship between models of vehicles for each make given in entity field #1. The linked list itself has a head portion which is owned by the various data elements of entity field #1. The continuation portion does not relate to the addresses of entity field #4, but rather to the addresses of pointer field 1-4 which in turn points to the address numbers of entity field #4.

Thus, it will be seen that address #1 in entity field #1 under the make "Dodge", the first member is pointer field #1 which in turn points to entity field address 1 for pick up. In the continuation field, it lists the next address as address 2 which in turn points to entity field #4, etc., and by tracing the continuation portion of the linked list together with the pointer, one discovers that Dodge manufactures a pick up, a sedan, a convertible and a mini-van, but not a station wagon. Lincoln manufactures only a sedan and a convertible. Chevrolet manufactures all five models listed in entity field #4. Corvette manufactures only a convertible. It will be quickly appreciated that while entity field #1 has only 15 entries and entity field #4 has only five entries, the pointer field 1-4 referred to by the continuation of the linked list may have 50 or 60 entries. This is illustrative of the fact that an entity-relation database in accordance with the present invention can have many more relation defining entries than information data entries thereby forming a so-called "sparse matrix" or fourth normal form data storage system. While it will be appreciated that any addition or deletion from entity field #4 might cause any number of changes to the linked pointing list 1-4, it will also be appreciated that a finite number of steps is involved related directly to the number of entries in entity field #1.

While Table E gives the linked pointing list 1-4 from which one could extract all of the models made for each make of automobile, Table E does not generate the reverse information, namely, all of the makes of automobiles for any given model. This relationship is specified by Table F which is again a linked pointing list. From linked pointing list 4-1, one can discover that pick-ups are manufactured by Dodge, Chevrolet, Jeep, and Ford, while sedans are manufactured by every member of entity field #1 except Corvette, Jeep and Thunderbird. Again, the number of entries to be found in the continuation of the linked list and the related pointer list 4-1 far exceeds the number of entries in either entity field #4 or entity field #1.

The two linked pointing lists 1-4 and 4-1 taken together define the total union of the two sets of data found in entity fields 1 and 4 as shown in Table G. While Table G shows such a concatenation of the linked pointing lists 1-4 and 4-1, such a concatenation is not restricted to merely the concatenation of the two entity fields. Any number of entity fields can be so related together. Further, each array of addresses of other data entries can itself be considered as a field which may be accessed through linked lists and pointer lists as necessary in order to define all of the needed relationships of a given database. Often the linking relationships are more complicated than one might first imagine. This requires one to carefully consider and plan the required inquiry paths, and encourages one to continuously modify the inquiry paths based on an examination of the data reflecting the actual workings of the database. The addition of inquiry paths through the use of new linked pointing lists can be done at any time, even while the database is continuing to receive data from event driven sources.

With the various relationships between fields within the database defined by the relationship defining mechanisms previously described, data retrieval time from the database is now determined by the indexing and search method employed to access the initial element of a predefined set of data elements. Upon access and retrieval of the initial element of the predefined set, all elements linked by the linking relationships are also retrieved. The retrieval can include, if desired, certain of the organizational information which is found in the data dictionary portion of the database. The preferred entity relation database employs two different methods for indexing entity fields. While the difference in performance of the two indexing methods for fields having a small number of entries is not significant, as fields become increasingly larger, a sort index comprising merely a numerical series of integers gives way to a three digit binary tree indexing. A practical, but not essential, division between the two indexing methods is where the field being indexed has more than 100 entries. The search mechanism employed for searching both indexes is the same, namely, binary searching, except that where a binary tree is employed the search always is initiated at the same point, namely the root of the tree. While in serial indexing, the start of the search is at the middle of the sort index. With each step in the sort as to both retrieval methods, one half of the database can be ignored since with each step the portion of the database containing the desired entry is always identified. In a true binary search of a sequential sort index, one half of the index is eliminated each time while in a binary tree search, this is only approximately true.

Figure 1:
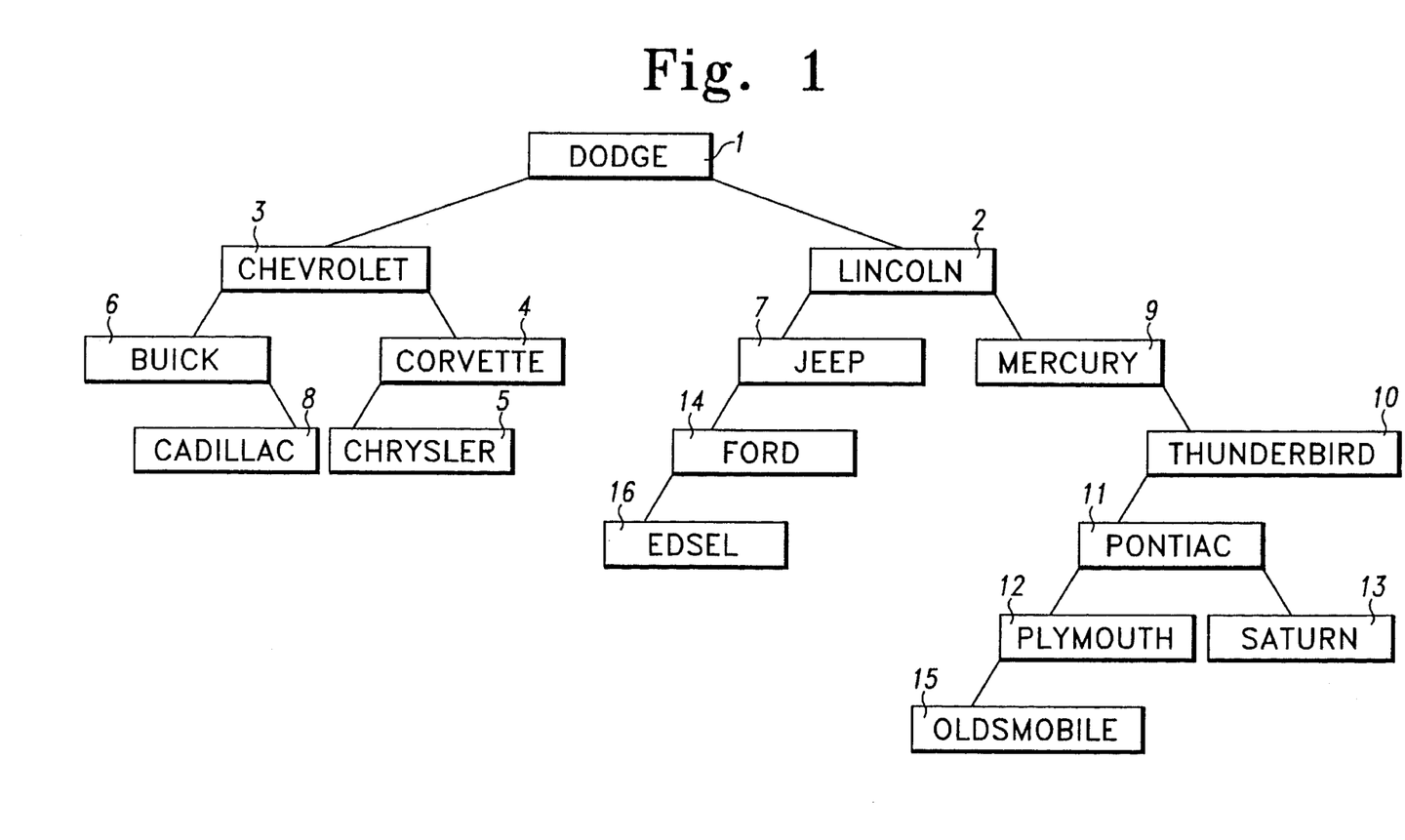
FIG. 1 is a diagram of a binary tree of the data shown in Table H.

The two types of indexing and the advantages to be enjoyed from such indexing are to be understood best from the examples shown in Tables H and $H_1$. Table H shows entity field #1 with the field addresses shown on the left and the sort index given on the right of the data so as to place the entity field #1 in alphabetic order. The binary tree sort is shown to the right of the sort index and includes three columns. The first column is the member to the left of the addressed column, the second column is the member to the right of the addressed column and the third column is the parent of the addressed element. Understand what is meant by "left" and "right", one should consider FIG. 1 which illustrates the binary tree generated by the sequential entry of the data in entity field #1 in the addressed order given. Since address #1 has data entry "Dodge", that entry forms the root of the tree. Thereafter with each entry sequentially entered, the data element either appears earlier in the alphabet and is therefore placed on the left of the root or appears later in the alphabet and is therefore placed on the right of the root. Each entry has only a single pair and, at most, has only two entries directly dependent from it, one on the left and one on the right. The binary tree sort numbers do not refer to the sort index numbers, but rather to the addresses of the data entries. It is to be understood that while Table H shows both a sequential sort index and a binary tree sort index, both such indexes would not be employed with respect to a single entity field and are merely illustrative to demonstrate the differences in performance between the two indexing methods.

The retrieval of a given data element using binary tree sorting will in general take a few more steps than the binary search of a serial sort index. This is due to the fact that the binary tree is not densely packed. That is, not every available leaf has an entry. If, as a matter of placement of data, each level of the tree were completely filled before the next lower level were utilized, then the time for access using both methods would be, on average, the same. To understand the difference, consider retrieving from entity field #1 the entry at address 10 which is "Thunderbird". Using a binary search of the sort index, one first goes to the middle of the field of link 15 which is sort index entry 8. Since the data appearing at that entry is sequentially below where one wants to be, sort index entries 1–8 are ignored and one goes to the middle of the remaining entries which would be sort index 12. This too is below the location where one wants to be thus one goes to the middle of the remaining field which is sort index 14. This too is below the entry desired, but there is only one entry left, namely 15 which is retrieved on the fourth step. Starting at the binary tree sort root which has a parent #0, one determines from the data entry that one needs to go to the right address given in the right column is 2, examination of the data entry at address 2 leads one to go further to the right. The address given in the right column from entry 2 is "9". Entry at address 9 such that one still needs to go to the right which is address 10 which is the desired entry.

As another example, if one wanted to retrieve "Oldsmobile" from entity field #1 using the sort index, the series of indices tested would be 8, 12, 10 and 11 which is merely four steps. On the other hand using the binary tree sort this series would start at the root with 1 and follow the path 2, 9, 10, 11, 12 and 15 which is seven entries. The difference in number steps for retrieval can be minimized by keeping track of the number of zero elements appearing in the left and right columns of the binary tree sort and by performing certain rotations in order to minimize the number of zeros above the bottom of the tree.

The significant advantage to using binary sort trees comes at such time as one needs to add or delete data from the entity field as shown in Table $H_1$. The addition of the entry "Edsel" at address 16 requires eleven changes in the sort index. On average, one half of the sort index values will have to change with each addition or deletion from entity field #1. On the other hand, the addition of an entry to the binary tree sort index requires merely four changes showing a new left dependent member for index entry 14, the parent of new entry 16 and, of course, since it is the newest member, the fact that both the left and right dependencies are empty. As indicated previously, where database contains more than 100 entries, this savings of time in index changes starts to become appreciable even on computers operating at very high speeds. Certainly when the length of the field amounts to 1,000 or 10,000 entries, a significant difference in write or delete time may be experienced. This of course depends in part as to the memory devices employed.

It is preferred that an entity-relation database in accordance with the present invention be maintained in such memory devices as will permit access in the shortest possible period of time. While generally it is preferred that the entirety of the database, including all of the relation defining fields, be maintained in the CPU memory of the selected computer, the use of virtual memory permits portions of the database to be stored in other devices which will only occasionally cause certain delays to occur. Regardless of the partition of the database to various memory devices, it is desirable that a back-up scheme be provided so that in the event of system failure, the database can be quickly reconstructed.

Figure 2:
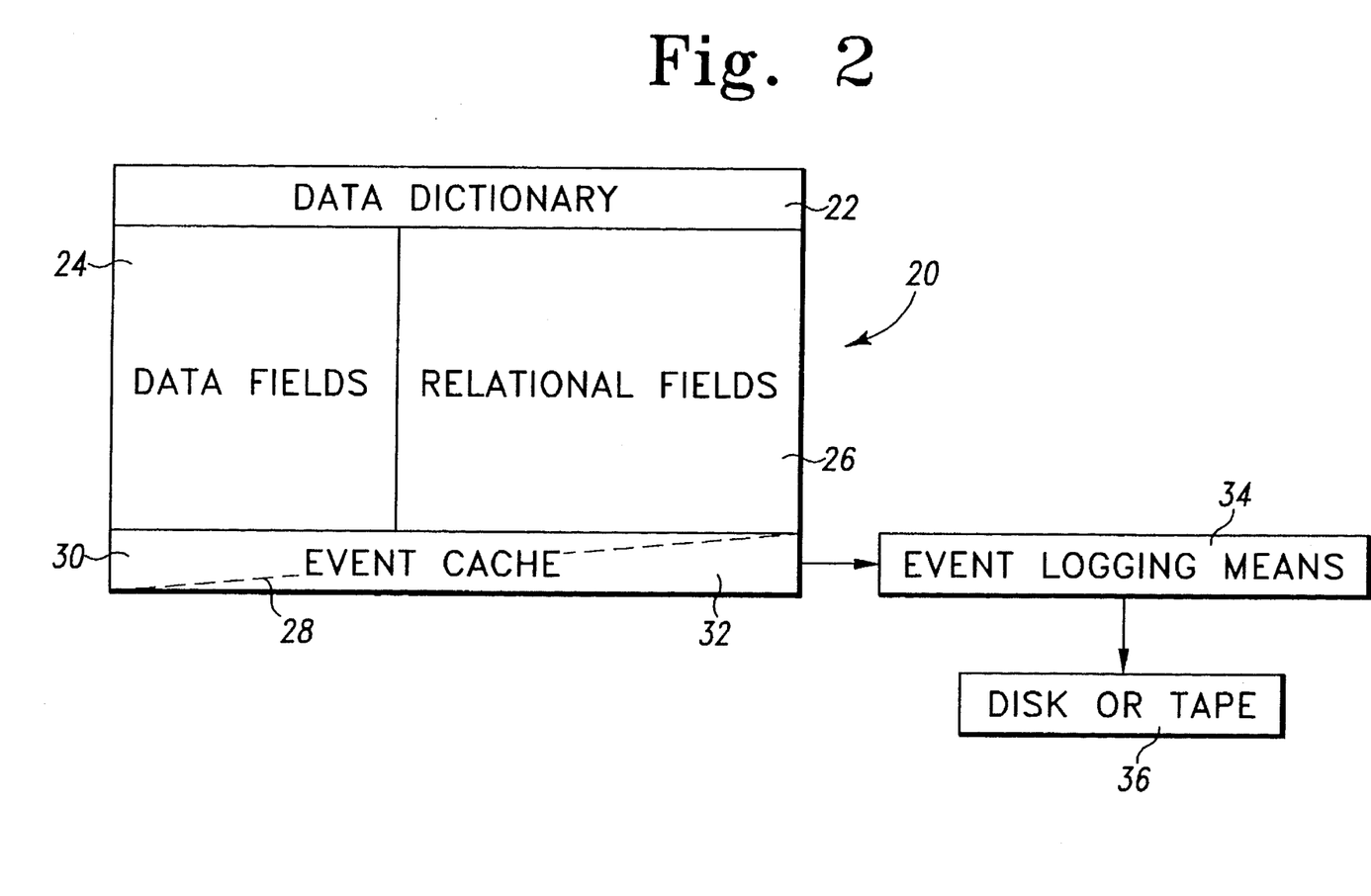
FIG. 2 is a block diagram of an event loging scheme used in connection with a database of the present invention.

While standard back-up schemes can be employed on a periodic basis to provide a snap shot of the database as a whole at a specific point in time while the system is otherwise inactive, it is desirable to maintain some means of providing additional back-up capability particularly where the period of time between back-ups is fairly large. In many process monitoring systems, back-up opportunities may occur as infrequently as once each week. In the event of system failure, a significant body of data can be lost. In order to prevent this, a preferred entity-relation database 20 is shown in FIG. 2. The database includes a data dictionary portion 22, defines the various files created in the database and defines the structural relationships between the various files in that database. Thus the data dictionary comprises all field definitions and their relationships by specifying the names of the fields, their types, sizes, ownership, data format, and the like. The remainder of the database is principally divided into data containing fields or entity fields 24 and relation fields 26 such as the pointing fields, linked lists, etc., previously discussed.

There is additionally provided an event cache 28 which is divided into two portions 30 and 32. The event cache is used to store on a temporary basis each change in the database which occurs in any of portions 22, 24 or 26. As a given portion 30 or 32 of the event cache becomes full, the contents of that portion is transferred or flushed by way of an event logging means 34 to a permanent storage record such as a disc or tape 36. During the transfer by the event transfer means 34, the portion of the event cache not previously in use is employed to record all changes in the database. When the second portion is full, portions are again switched and the second portion is transferred by the event transfer means to the permanent storage media. In the unlikely event that the transfer to the permanent media occurs slower than the filling of the one portion of the event cache, a signal can be provided to temporarily suspend data entry into the database 20 and to provide appropriate diagnostic information indicating that a faster data transfer from the event cache to the permanent storage means is required.

One preferred embodiment of a computer program in accordance with the present invention is presented in the microfiche appendix. Written in the computer language C, this computer program can be implemented on a wide variety of computer hardware.

Although the invention has been described in detail with reference to certain tables and figures illustrating the preferred embodiment, variations and modifications exist within the scope and spirit of the invention as described and defined in the following claims.

TABLE A

| | ENTITY FIELD #1 | |
|---|---|---|
| ADDRESS | DATA | SORT INDEX |
| 0 | -BLANK- | 15 |
| 1 | DODGE | 6 |
| 2 | LINCOLN | 9 |
| 3 | CHEVROLET | 3 |
| 4 | CORVETTE | 5 |
| 5 | CHRYSLER | 4 |
| 6 | BUICK | 1 |
| 7 | JEEP | 8 |
| 8 | CADILLAC | 2 |
| 9 | MERCURY | 10 |
| 10 | THUNDERBIRD | 15 |
| 11 | PONTIAC | 13 |
| 12 | PLYMOUTH | 12 |
| 13 | SATURN | 14 |
| 14 | FORD | 7 |
| 15 | OLDSMOBILE | 11 |
| 16 | -BLANK- | 0 |
| 17 | -BLANK- | 0 |
| 18 | -BLANK- | 0 |
| 19 | -BLANK- | 0 |
| 20 | -BLANK- | 0 |

TABLE B

| ENTITY FIELD #1 | | | ENTITY FIELD #2 (OWNED) | |
|---|---|---|---|---|
| ADDRESS | DATA | SORT INDEX | ADDRESS | DATA |
| 0 | -BLANK- | 15 | 0 | -BLANK- |
| 1 | DODGE | 6 | 1 | CHRYSLER |
| 2 | LINCOLN | 9 | 2 | FORD |
| 3 | CHEVROLET | 3 | 3 | GENERAL MOTORS |
| 4 | CORVETTE | 5 | 4 | GENERAL MOTORS |
| 5 | CHRYSLER | 4 | 5 | CHRYSLER |
| 6 | BUICK | 1 | 6 | GENERAL MOTORS |
| 7 | JEEP | 8 | 7 | CHRYSLER |
| 8 | CADILLAC | 2 | 8 | GENERAL MOTORS |
| 9 | MERCURY | 10 | 9 | FORD |
| 10 | THUNDERBIRD | 15 | 10 | FORD |
| 11 | PONTIAC | 13 | 11 | GENERAL MOTORS |
| 12 | PLYMOUTH | 12 | 12 | CHRYSLER |
| 13 | SATURN | 14 | 13 | SATURN |
| 14 | FORD | 7 | 14 | FORD |
| 15 | OLDSMOBILE | 11 | 15 | GENERAL MOTORS |
| 16 | -BLANK- | 0 | 0 | -BLANK- |
| 17 | -BLANK- | 0 | 0 | -BLANK- |
| 18 | -BLANK- | 0 | 0 | -BLANK- |
| 19 | -BLANK- | 0 | 0 | -BLANK- |
| 20 | -BLANK- | 0 | 0 | -BLANK- |

TABLE C

| | | POINTING FIELD 1-3 | | | |
|---|---|---|---|---|---|
| ENTITY FIELD #1 | | POINTING FIELD | | ENTITY FIELD #3 | |
| A# | DATA | OWNED BY #1 | | A# | DATA |
| 0 | -BLANK- | 0 | 0 | 0 | -BLANK- |
| 1 | DODGE | 1 | 3 | 1 | GENERAL MOTORS |
| 2 | LINCOLN | 2 | 2 | 2 | FORD |
| 3 | CHEVROLET | 3 | 1 | 3 | CHRYSLER |
| 4 | CORVETTE | 4 | 1 | 4 | SATURN |
| 5 | CHRYSLER | 5 | 3 | | |
| 6 | BUICK | 6 | 1 | | |
| 7 | JEEP | 7 | 3 | | |
| 8 | CADILLAC | 8 | 1 | | |
| 9 | MERCURY | 9 | 2 | | |
| 10 | THUNDERBIRD | 10 | 2 | | |
| 11 | PONTIAC | 11 | 1 | | |
| 12 | PLYMOUTH | 12 | 3 | | |
| 13 | SATURN | 13 | 4 | | |
| 14 | FORD | 14 | 2 | | |
| 15 | OLDSMOBILE | 15 | 1 | | |
| 16 | -BLANK- | | | | |
| 17 | | | | | |
| 18 | | | | | |
| 19 | | | | | |
| 20 | | | | | |

TABLE D

| | | ENTITY LINKING LIST 3-1 | | | | | |
|---|---|---|---|---|---|---|---|
| ENTITY FIELD #3 | | HEAD | | CONTINUATION | | ENTITY FIELD #1 | |
| A# | DATA | L | F | P | N | A# | DATA |
| 0 | -BLANK- | 0 | 0 | 0 | 0 | 0 | -BLANK- |
| 1 | GENERAL MOTORS | 15 | 6 | 5 | 7 | 1 | DODGE |
| 2 | FORD | 10 | 14 | 14 | 9 | 2 | LINCOLN |
| 3 | CHRYSLER | 12 | 5 | 8 | 4 | 3 | CHEVROLET |
| 4 | SATURN | 13 | 13 | 3 | 11 | 4 | CORVETTE |
| | | | | 0 | 1 | 5 | CHRYSLER |
| | | | | 0 | 8 | 6 | BUICK |
| | | | | 1 | 12 | 7 | JEEP |
| | | | | 6 | 3 | 8 | CADILLAC |
| | | | | 2 | 10 | 9 | MERCURY |
| | | | | 9 | 0 | 10 | THUNDERBIRD |
| | | | | 4 | 15 | 11 | PONTIAC |
| | | | | 7 | 0 | 12 | PLYMOUTH |
| | | | | 0 | 0 | 13 | SATURN |
| | | | | 0 | 2 | 14 | FORD |
| | | | | 11 | 0 | 15 | OLDSMOBILE |

[CHECK SUM n(n + 1)/2 = 120]

TABLE D$_1$

| | | ENTITY LINKING LIST 3-1)+) | | | | | |
|---|---|---|---|---|---|---|---|
| ENTITY FIELD #3 | | HEAD | | CONTINUATION | | ENTITY FIELD #1 | |
| A# | DATA | L | F | P | N | A# | DATA |
| 0 | -BLANK- | 0 | 0 | 0 | 0 | 0 | -BLANK- |
| 1 | GENERAL MOTORS | 15 | 6 | 5 | 7 | 1 | DODGE |
| 2 | FORD | <u>16</u> | 14 | 14 | 9 | 2 | LINCOLN |
| 3 | CHRYSLER | 12 | 5 | 8 | 4 | 3 | CHEVROLET |
| 4 | SATURN | 13 | 13 | 3 | 11 | 4 | CORVETTE |
| | | | | 0 | 1 | 5 | CHRYSLER |
| | | | | 0 | 8 | 6 | BUICK |
| | | | | 1 | 12 | 7 | JEEP |

TABLE D₁-continued

ENTITY LINKING LIST 3-1+)

| ENTITY FIELD #3 | | HEAD | | CONTINUATION | | ENTITY FIELD #1 | |
|---|---|---|---|---|---|---|---|
| A# | DATA | L | F | P | N | A# | DATA |
| | | | | 6 | 3 | 8 | CADILLAC |
| | | | | 2 | 10 | 9 | MERCURY |
| | | | | 9 | <u>16</u> | 10 | THUNDERBIRD |
| | | | | 4 | 15 | 11 | PONTIAC |
| | | | | 7 | 0 | 12 | PLYMOUTH |
| | | | | 0 | 0 | 13 | SATURN |
| | | | | 0 | 2 | 14 | FORD |
| | | | | 11 | 0 | 15 | OLDSMOBILE |
| | | | | <u>10</u> | <u>0</u> | 16 | <u>EDSEL</u> |

(ADDED ENTRY)
[CHECK SUM n(n + 1)/2 = 136]

TABLE D₂

ENTITY LINKING LIST (3-1(-))

| ENTITY FIELD #3 | | HEAD | | CONTINUATION | | ENTITY FIELD #1 | |
|---|---|---|---|---|---|---|---|
| A# | DATA | L | F | P | N | A# | DATA |
| 0 | -BLANK- | 0 | 0 | 0 | 0 | 0 | -BLANK- |
| 1 | GENERAL MOTORS | 15 | 6 | 5 | 7 | 1 | DODGE |
| 2 | FORD | 10 | 14 | <u>-13</u> | <u>-13</u> | 2 | LINCOLN(DELETED) |
| 3 | CHRYLSER | 12 | 5 | 8 | 4 | 3 | <u>CHEVROLET</u> |
| 4 | SATURN | 13 | 13 | 3 | 11 | 4 | CORVETTE |
| | | | | 0 | 1 | 5 | CHRYSLER |
| | | | | 0 | 8 | 6 | BUICK |
| | | | | 1 | 12 | 7 | JEEP |
| | | | | 6 | 3 | 8 | CADILLAC |
| | | | | <u>14</u> | 10 | 9 | MERCURY |
| | | | | 9 | 0 | 10 | THUNDERBIRD |
| | | | | 4 | 15 | 11 | PONTIAC |
| | | | | 7 | 0 | 12 | PLYMOUTH |
| | | | | 0 | 0 | 13 | SATURN |
| | | | | 0 | <u>9</u> | 14 | FORD |
| | | | | 11 | 0 | 15 | OLDSMOBILE |

[CHECK SUM n(n + 1)/2 = 105]
[CONTINUATION TABLE ENTRY AT THE DELETION IS -(n - j)]

TABLE E

LINKING POINTING LIST 1-4

| ENTITY FIELD #1 | | HEAD | | CONTINUATION | | POINTER 1-4 | | ENTITY FIELD #4 | |
|---|---|---|---|---|---|---|---|---|---|
| A# | DATA | L | F | P | N | PA# | A#4 | A# | DATA |
| 0 | -BLANK- | 0 | 0 | 0 | 0 | 0 | 0 | 0 | -BLANK- |
| 1 | DODGE | 4 | 1 | 0 | 2 | 1 | 1 | 1 | PICK-UP |
| 2 | LINCOLN | 6 | 5 | 1 | 3 | 2 | 2 | 2 | SEDAN |
| 3 | CHEVROLET | 11 | 7 | 2 | 4 | 3 | 3 | 3 | CONVERTABLE |
| 4 | CORVETTE | 12 | 12 | 3 | 0 | 4 | 4 | 4 | MINI-VAN |
| 5 | CHRYSLER | 15 | 13 | 0 | 6 | 5 | 2 | 5 | STATION-WAGON |
| 6 | BUICK | 18 | 16 | 5 | 0 | 6 | 3 | 6 | -BLANK- |
| 7 | JEEP | 21 | 19 | 0 | 8 | 7 | 1 | | |
| 8 | CADILLAC | — | — | 7 | 9 | 8 | 2 | | |
| 9 | MERCURY | — | — | 8 | 10 | 9 | 3 | | |
| 10 | THUNDERBIRD | — | — | 9 | 11 | 10 | 4 | | |
| 11 | PONTIAC | — | — | 10 | 0 | 11 | 5 | | |
| 12 | PLYMOUTH | — | — | 0 | 0 | 12 | 3 | | |
| 13 | SATURN | — | — | 0 | 14 | 13 | 2 | | |
| 14 | FORD | — | — | 13 | 15 | 14 | 3 | | |
| 15 | OLDSMOBILE | — | — | 14 | 0 | 15 | 4 | | |
| 16 | -BLANK- | 0 | 0 | 0 | 17 | 16 | 2 | | |

TABLE E-continued

LINKING POINTING LIST 1-4

| ENTITY FIELD #1 | | HEAD | | CONTINUATION | | | POINTER 1-4 | | ENTITY FIELD #4 | |
|---|---|---|---|---|---|---|---|---|---|---|
| A# | DATA | L | F | P | N | PA# | A#4 | A# | DATA | |
| 17 | -BLANK- | 0 | 0 | 16 | 18 | 17 | 3 | | | |
| | | | | 17 | 0 | 18 | 5 | | | |
| | | | | 0 | 20 | 19 | 1 | | | |
| | | | | 19 | 21 | 20 | 3 | | | |
| | | | | 20 | 0 | 21 | 5 | | | |
| | | | | — | — | 22 | — | | | |

TABLE F

LINKING POINTING LIST 4-1

| ENTITY FIELD #4 | | HEAD | | CONTINUATION | | | POINTER 4-1 | | ENTITY FIELD #1 | |
|---|---|---|---|---|---|---|---|---|---|---|
| A# | DATA | L | F | P | N | PA# | A#1 | A# | DATA | |
| 0 | -BLANK- | 0 | 0 | 0 | 0 | 0 | 0 | 0 | -BLANK- | |
| 1 | PICK-UP | 4 | 1 | 0 | 2 | 1 | 1 | 1 | DODGE | |
| 2 | SEDAN | 16 | 5 | 1 | 3 | 2 | 3 | 2 | LINCOLN | |
| 3 | CONVERT. | 29 | 17 | 2 | 4 | 3 | 7 | 3 | CHEVROLET | |
| 4 | MINI-VAN | — | 30 | 3 | 0 | 4 | 14 | 4 | CORVETTE | |
| 5 | S-WAGON | — | — | 0 | 6 | 5 | 1 | 5 | CHRYSLER | |
| 6 | -BLANK- | 0 | 0 | 5 | 7 | 6 | 2 | 6 | BUICK | |
| | | | | 6 | 8 | 7 | 3 | 7 | JEEP | |
| | | | | 7 | 9 | 8 | 5 | 8 | CADILLAC | |
| | | | | 8 | 10 | 9 | 6 | 9 | MERCURY | |
| | | | | 9 | 11 | 10 | 8 | 10 | THUNDERBIRD | |
| | | | | 10 | 12 | 11 | 9 | 11 | PONTIAC | |
| | | | | 11 | 13 | 12 | 11 | 12 | PLYMOUTH | |
| | | | | 12 | 14 | 13 | 12 | 13 | SATURN | |
| | | | | 13 | 15 | 14 | 13 | 14 | FORD | |
| | | | | 14 | 16 | 15 | 14 | 15 | OLDSMOBILE | |
| | | | | 15 | 0 | 16 | 15 | 16 | -BLANK- | |
| | | | | 0 | 18 | 17 | 1 | | | |
| | | | | 17 | 19 | 18 | 2 | | | |
| | | | | 18 | 20 | 19 | 3 | | | |
| | | | | 19 | 21 | 20 | 4 | | | |
| | | | | 20 | 22 | 21 | 5 | | | |
| | | | | 21 | 23. | 22 | 6 | | | |

TABLE G

CONCATENATED LINKING POINTING LIST 1441

| 1-4 HEAD | | 1-4 CONTINUATION | | 4-1 POINTER 1-4 | | 4-1 HEAD | | CONTINUATION | | POINTER 4-1 | |
|---|---|---|---|---|---|---|---|---|---|---|---|
| L | F | P | N | PA# | A#4 | L | F | P | N | PA# | A#1 |
| 0 | 0 | 0 | 0 | 0 | 0 | 0 | 0 | 0 | 0 | 0 | 0 |
| 4 | 1 | 0 | 2 | 1 | 1 | 4 | 1 | 0 | 2 | 1 | 1 |
| 6 | 5 | 1 | 3 | 2 | 2 | 16 | 5 | 1 | 3 | 2 | 3 |
| 11 | 7 | 2 | 4 | 3 | 3 | 29 | 17 | 2 | 4 | 3 | 7 |
| 12 | 12 | 3 | 0 | 4 | 4 | — | 30 | 3 | 10 | 4 | 14 |
| 15 | 13 | 0 | 6 | 5 | 2 | — | — | 0 | 6 | 5 | 1 |
| 18 | 16 | 5 | 0 | 6 | 3 | 0 | 0 | 5 | 7 | 6 | 2 |
| 21 | 19 | 0 | 8 | 7 | 1 | | | 6 | 8 | 7 | 3 |
| — | — | 7 | 9 | 8 | 2 | | | 7 | 9 | 8 | 5 |
| — | — | 8 | 10 | 9 | 3 | | | 8 | 10 | 9 | 6 |
| — | — | 9 | 11 | 10 | 4 | | | 9 | 11 | 10 | 8 |
| — | — | 10 | 0 | 11 | 5 | | | 10 | 12 | 11 | 9 |
| — | — | 0 | 0 | 12 | 3 | | | 11 | 13 | 12 | 11 |
| — | — | 0 | 14 | 13 | 2 | 0 | 0 | 12 | 14 | 13 | 12 |
| — | — | 13 | 15 | 14 | 3 | | | 13 | 15 | 14 | 13 |
| — | — | 14 | 0 | 15 | 4 | | | 14 | 16 | 15 | 14 |

TABLE G-continued

CONCATENATED LINKING POINTING LIST 1441

| 1-4 HEAD | | 1-4 CONTINUATION | | 4-1 POINTER 1-4 | | 4-1 HEAD | | CONTINUATION | | POINTER 4-1 | |
|---|---|---|---|---|---|---|---|---|---|---|---|
| L | F | P | N | PA# | A#4 | L | F | P | N | PA# | A#1 |
| 0 | 0 | 0 | 17 | 16 | 2 | | | 15 | 0 | 16 | 15 |
| 0 | 0 | 16 | 18 | 17 | 3 | | | 0 | 18 | 17 | 1 |
| | | 17 | 0 | 18 | 5 | | | 17 | 19 | 18 | 2 |
| | | 0 | 20 | 19 | 1 | | | 18 | 20 | 19 | 3 |
| | | 19 | 21 | 20 | 3 | | | 19 | 21 | 20 | 4 |
| | | 20 | 0 | 21 | 5 | | | 20 | 22 | 21 | 5 |
| | | — | — | 22 | — | | | 21 | 23. | 22 | 6 |

TABLE H

| ENTITY FIELD #1 | | | BINARY TREE SORT | | |
|---|---|---|---|---|---|
| ADDRESS | DATA | SORT INDEX | LFT | RHT | PRNT |
| 0 | -BLANK- | 15 | 1 | −16 | 15 |
| 1 | DODGE | 6 | 3 | 2 | 0 |
| 2 | LINCOLN | 9 | 7 | 9 | 1 |
| 3 | CHEVROLET | 3 | 6 | 4 | 1 |
| 4 | CORVETTE | 5 | 5 | 0 | 3 |
| 5 | CHRYSLER | 4 | 0 | 0 | 4 |
| 6 | BUICK | 1 | 0 | 8 | 3 |
| 7 | JEEP | 8 | 14 | 0 | 2 |
| 8 | CADILLAC | 2 | 0 | 0 | 6 |
| 9 | MERCURY | 10 | 0 | 10 | 2 |
| 10 | THUNDERBIRD | 15 | 11 | 0 | 9 |
| 11 | PONTIAC | 13 | 12 | 13 | 10 |
| 12 | PLYMOUTH | 12 | 15 | 0 | 11 |
| 13 | SATURN | 14 | 0 | 0 | 11 |
| 14 | FORD | 7 | 0 | 0 | 7 |
| 15 | OLDSMOBILE | 11 | 0 | 0 | 12 |
| 16 | -BLANK- | 0 | −1 | −17 | −1 |
| 17 | -BLANK- | −1 | −1 | −18 | −1 |
| 18 | -BLANK- | 0 | −1 | −19 | −1 |
| 19 | -BLANK- | 0 | −1 | −20 | −1 |
| 20 | -BLANK- | 0 | −1 | 0 | −1 |

TABLE H₁

| ENTITY FIELD #1 | | | BINARY TREE SORT | | |
|---|---|---|---|---|---|
| ADDRESS | DATA | SORT INDEX | LFT | RHT | PRNT |
| 0 | -BLANK- | 16 | 1 | −16 | 15 |
| 1 | DODGE | 6 | 3 | 2 | 0 |
| 2 | LINCOLN | 10 | 7 | 9 | 1 |
| 3 | CHEVROLET | 3 | 6 | 4 | 1 |
| 4 | CORVETTE | 5 | 5 | 0 | 3 |
| 5 | CHRYSLER | 4 | 0 | 0 | 4 |
| 6 | BUICK | 1 | 0 | 8 | 3 |
| 7 | JEEP | 9 | 14 | 0 | 2 |
| 8 | CADILLAC | 2 | 0 | 0 | 6 |
| 9 | MERCURY | 11 | 0 | 10 | 2 |
| 10 | THUNDERBIRD | 16 | 11 | 0 | 9 |
| 11 | PONTIAC | 14 | 12 | 13 | 10 |
| 12 | PLYMOUTH | 13 | 15 | 0 | 11 |
| 13 | SATURN | 15 | 0 | 0 | 11 |
| 14 | FORD | 8 | 16 | 0 | 7 |
| 15 | OLDSMOBILE | 12 | 0 | 0 | 12 |
| 16 | EDSEL | 7 | 0 | 0 | 14 |
| 17 | -BLANK- | 0 | −1 | −18 | −1 |
| 18 | -BLANK- | 0 | −1 | −19 | −1 |
| 19 | -BLANK- | 0 | −1 | −20 | −1 |

TABLE H₁-continued

| ENTITY FIELD #1 | | BINARY TREE SORT | | |
|---|---|---|---|---|
| ADDRESS DATA | SORT INDEX | LFT | RHT | PRNT |
| 20      -BLANK- | 0 | −1 | 0 | −1 |

What is claimed is:

1. A data processing system for processing data elements reflecting selected parameters comprising:

a memory, means for writing the data elements into the memory arranged as an entity-relation database, the data elements reflecting each selected parameter being arranged into an entity field of data elements, with related data elements reflecting a common parameter with at least some of the data elements being included in at least one additional entity field, means for generating for each selected parameter a linked list linking all the related data elements of the selected parameter, the linked list including a head portion containing an address within the memory for a first and last data element of the selected parameter, and a continuation portion, associated with each data element of the selected parameter, containing an address for each next element and each previous element of the selected parameter, means for associating at least some of the data elements with the related data elements reflecting a common parameter with at least some of the data elements, arranged as a relationship defining field within the memory, including means for pointer indexing the data elements of at least some of the entity fields, each pointer index covering only a single entity field and including a searchable network of addresses of data elements within each single entity field and, associated with each address, a linking pointer list providing means for retrieving all related elements reflecting a common parameter with the data element at the address from at least one other entity field in an order defined by the linking pointer list, means for binary sort tree indexing the data elements of at least some of the fields into ordered arrays, each binary sort tree index covering only a single entity field and including a searchable network of integers arranged in groups of three integers for each of the data elements, each group of three integers being associated with the address of a single data element, one of the three integers specifying the indexing integer of a parent data element of the same entity field, and each of the two remaining integers specifying the indexing integer of any immediately dependent data elements of the same entity field, and means for retrieving all of the related data elements of a chosen data element including means for searching the network of integers of a selected field to identify the address of the chosen data element, and means for reading a linked list associated with the chosen data element thereby retrieving a chosen data set within a predetermined known upper limit of time.

2. The data processing system of claim 1 wherein the linking pointer list of each pointer indexing means comprises:

a head portion associated with an element of a first entity field containing an address for a first element and an address for a last element of the set of all elements in a second entity field related to the first entity field by a common parameter, and a continuation portion, associated with each of the elements in the second entity field related to the first entity field by a common parameter, containing an address for each next element and an address for each previous element of the set of elements pointing to the same related element of the first entity field.

3. The data processing system of claim 1 wherein the means for pointer indexing has created at least two pointer indexes of data elements of at least two different entity fields with related data elements including at least two reciprocal linking pointer lists, and the system further comprises means for retrieving data elements from entity fields associated by said reciprocal linking pointer lists by way of a concatenation of said reciprocal linking pointer lists allowing retrieval of all data elements related to a chosen data element of a selected entity field from all entity fields associated with the selected entity field by said reciprocal linking pointer lists.

4. The data processing system of claim 1 further comprising means for checking the integrity of the linked lists including means for comparing the sum of the first and next element addresses with the sum of the last and previous element addresses within each linked list.

5. The data processing system of claim 1 further comprising means for continuous revision within a predetermined known upper limit of time, including means for adding data elements to the entity-relation database so that the data elements reflecting each selected parameter are arranged into the entity field of the data elements reflecting the selected parameter and the related data elements reflecting a common parameter with at least some of the data elements are included in at least one additional entity field, means for deleting data elements from the entity-relation database, means for revising the linked list for each selected parameter upon addition and deletion of data elements so that the head portion contains an address within the memory for the first and last data elements of the selected parameter and the continuation portion contains the address for each next element and each previous element of the selected parameter, means for revising the binary sort tree indexes upon addition and deletion of data elements, and means for revising the pointer indexes and the linking pointer lists upon addition and deletion of data elements.

6. The data processing system of claim 5 wherein the linking pointer list of each pointer indexing means comprises:

a head portion associated with an element of a first entity field containing an address for a first element and an address for a last element of the set of all elements in a second entity field related to the first entity field by a common parameter, and a continuation portion, associated with each of the elements in the second entity field related to the first entity field by a common parameter, containing an address for each next element and an address for each previous element of the set of elements pointing to the same related element of the first entity field.

7. The data processing system of claim 5 wherein the means for pointer indexing has created at least two pointer indexes of data elements of at least two different entity fields with related data elements including at least two reciprocal linking pointer lists, and the system further comprises means for retrieving data elements from entity fields associated by said reciprocal linking pointer lists by way of a concatenation of said reciprocal linking pointer lists allowing retrieval of all data elements related to a chosen data element of a selected entity field from all entity fields associated with the selected entity field by said reciprocal linking pointer lists.

8. The data processing system of claim 5 further comprising means for providing a backup record of the data elements including a permanent record storage means for storing a permanent record of the data elements, a cache divided into at least two portions connected to the permanent record storage means, means connected to the cache for logging to the cache each transaction within the memory which causes a change to at least one data element, and means for flushing the contents of one portion of the cache to the permanent record storage means upon filling of said one portion while allowing logging to another portion of the cache to continue.

9. The data processing system of claim 8 wherein the permanent record storage means comprises an erasable medium, and means for recording data on the medium reflecting the contents of said one portion of the cache.

10. A data processing system for monitoring an ongoing operation from which data elements are gathered reflecting selected parameters of the ongoing operation comprising:

a memory, means for writing the data elements into the memory arranged as an entity-relation database, the data elements reflecting each selected parameter being arranged into an entity field of data elements, the related data elements reflecting a common parameter with at least some of the data elements being included in at least one additional entity field, means for generating for each selected parameter a linked list linking all the related data elements of the selected parameter, the linked list including a head portion containing an address within the memory for a first and last data element of the selected parameter, and a continuation portion, associated with each data element of the selected parameter, containing an address for each next element and each previous element of the selected parameter, means for associating at least some of the data elements with related data elements reflecting a common parameter with at least some of the data elements, arranged as a relationship defining field within the memory, including means for pointer indexing the data elements of at least some of the entity fields, each pointer index covering only a single entity field and including a searchable network of addresses of data elements within each single entity field and, associated with each address, a linking pointer list providing means for retrieving all related elements reflecting a common parameter with the data element at the address from at least one other entity field in either of two orders defined by the linking pointer list, means for binary sort tree indexing the data elements of at least some of the fields into ordered arrays, each binary sort tree index covering only a single entity field and including a searchable network of integers arranged in groups of three integers for each of the data elements, each group of three integers being associated with the address of a single data element, one of the three integers specifying the indexing integer of a parent data element of the same entity field, and each of the two remaining integers specifying the indexing integer of any immediately dependent data elements of the same entity field, and means for retrieving all of the related data elements of a chosen data element including means for searching the network of integers of a selected field to identify the address of the chosen data element, and means for reading a linked list associated with the chosen data element thereby retrieving a chosen data set within a known upper limit of time set by the rate of said ongoing operation which is being monitored by the data processing system.

11. The data processing system of claim 10 wherein the linking pointer list of each pointer indexing means comprises:

a head portion associated with an element of a first entity field containing an address for a first element and an address for a last element of the set of all elements in a second entity field related to the first entity field by a common parameter, and a continuation portion, associated with each of the elements in the second entity field related to the first entity field by a common parameter, containing an address for each next element and an address for each previous element of the set of elements pointing to the same related element of the first entity field.

12. The data processing system of claim 10 wherein the means for pointer indexing has created at least two pointer indexes of data elements of at least two different entity fields with related data elements including at least two reciprocal linking pointer lists, and the system further comprises means for retrieving data elements from entity fields associated by said reciprocal linking pointer lists by way of a concatenation of said reciprocal linking pointer lists allowing retrieval of all data elements related to a chosen data element of a selected entity field from all entity fields associated with the selected entity field by said reciprocal linking pointer lists.

13. The data processing system of claim 10 further comprising means for checking the integrity of the linked lists including means for comparing the sum of the first and next element addresses with the sum of the last and previous element addresses within each linked list.

14. The data processing system of claim 10 further comprising means for continuous revision within a known upper limit of time set by the rate of said ongoing operation, including means for adding data elements to the entity-relation database so that the data elements reflecting each selected parameter are arranged into the entity field of the data elements reflecting the selected parameter and the related data elements reflecting a common parameter with at least some of the data elements are included in at least one additional entity field, means for deleting data elements from the entity-relation database, means for revising the linked list for each selected parameter upon addition and deletion of data elements so that the head portion contains an address within the memory for the first and last data elements of the selected parameter and the continuation portion contains the address for each next element and each previous element of the selected parameter, means for revising the binary sort tree indexes upon addition and deletion of data elements, and means for revising the pointer indexes and the linking pointer lists upon addition and deletion of data elements.

15. The data processing system of claim 14 wherein the linking pointer list of each pointer indexing means comprises:

a head portion associated with an element of a first entity field containing an address for a first element and an address for a last element of the set of all elements in a second entity field related to the first entity field by a common parameter, and a continuation portion, associated with each of the elements in the second entity field related to the first entity field by a common parameter, containing an address for each next element and an address for each previous element of the set of elements pointing to the same related element of the first entity field.

16. The data processing system of claim 14 wherein the means for pointer indexing has created at least two pointer indexes of data elements of at least two different entity fields with related data elements including at least two reciprocal linking pointer lists, and the system further comprises means for retrieving data elements from entity fields associated by said reciprocal linking pointer lists by way of a concatenation of said reciprocal linking pointer lists allowing retrieval of all data elements related to a chosen data element of a selected entity field from all entity fields associated with the selected entity field by said reciprocal linking pointer lists.

17. The data processing system of claim 14 further comprising means for providing a backup record of the data elements including a permanent record storage means for storing a permanent record of the data elements, a cache divided into at least two portions connected to the permanent record storage means, means connected to the cache for logging to the cache each transaction within the memory which causes a change to at least one data element, and means for flushing the contents of one portion of the cache to the permanent record storage means upon filling of said one portion while allowing logging to another portion of the cache to continue.

18. The data processing system of claim 17 wherein the permanent record storage means comprises an erasable medium, and means for recording data on the medium reflecting the contents of said one portion of the cache.

19. A data processing system for monitoring an ongoing operation from which data elements are gathered reflecting selected parameters of the ongoing operation comprising:

a memory, means for writing the data elements into the memory arranged as an entity-relation database, the data elements reflecting each selected parameter being arranged into an entity field of data elements, and related data elements reflecting a common parameter with at least some of the data elements being included in at least one additional entity field, a plurality of linking pointer lists, each linking pointer list arranged as a relationship defining field within the memory and associating each of a plurality of data elements of a first entity field with a plurality of related data elements of a second entity field so that each of the plurality of data elements of the first entity field reflects a common parameter with a plurality of related data elements of the second entity field, and providing means for identifying and retrieving all related data elements of the second entity field reflecting a common parameter with a selected data element of the first entity field in an order defined by the linking pointer list, each linking pointer list including a pointer index for pointer indexing at least some data elements of the second entity field, including a plurality of pointer index elements and a searchable network of addresses of pointer index elements associated with at least some data elements of the second entity field, and a linked list having a head portion associated with the address of each of the plurality of data elements of the first entity field, containing an address for a first pointer index element of a pointer index covering the second entity field and pointing to a data element of the second entity field reflecting a common parameter with one data element of the first entity field, and an address for a last pointer index element of the pointer index covering the second entity field and pointing to a data element of the second entity field reflecting a common parameter with one data element of the first entity field, and a continuation portion, associated with each pointer index element in the pointer index, containing an address for each next pointer index element of the pointer index and pointing to a data element of the second entity field reflecting a common parameter with the data element of the first entity field, and an address for each previous pointer index element of the pointer index and pointing to a data element of the second entity field reflecting a common parameter with the data element of the first entity field, a plurality of binary sort tree indexes for indexing the data elements of at least some of the entity fields into ordered arrays, each binary sort tree index covering only a single entity field and including a searchable network of integers arranged in groups of three integers for each of the data elements, each group of three integers being associated with the address of a single data element, one of the three integers specifying the indexing integer of a parent data element of the same entity field, and each of the two remaining integers specifying the indexing integer of any immediately dependent data elements of the same entity field, and means for retrieving all data elements from at least one entity field related to a chosen data element of a selected entity field within a predetermined known upper limit of time set by the rate of the ongoing operation which is being monitored by the data processing system, including means for searching the network of integers of a selected entity field to identify the address of the chosen data element, and means for reading the linking pointer list associated with the chosen data element.

20. The data processing system of claim 19 further comprising means for continuous revision within a known upper limit of time set by the rate of the ongoing operation, including means for adding data elements to the entity-relation database whereby the data elements reflecting each selected parameter are arranged into the entity field of the data elements reflecting the selected parameter and related data elements reflecting a common parameter with at least some of the data elements are included in at least one additional entity field, means for deleting data elements from the entity-relation database, means for revising the linking pointer lists upon addition and deletion of data elements, including means for revising the pointer indexes, means for revising the linked lists upon addition and deletion of data elements so that the head portion of each linked list contains an address within the memory for the first pointer index element and an address for the last pointer index element, and the continuation portion of each linked list contains the address for each next pointer index element and each previous pointer index element, and means for revising the binary sort tree indexes upon addition and deletion of data elements.

21. The data processing system of claim 20 further comprising means for checking the integrity of the linked lists including means for comparing the sum of the first and next pointer index element addresses with the sum of the last and previous pointer index element addresses within each linked list.

22. The data processing system of claim 20 further comprising means for providing a backup record of the data elements including a permanent record storage means for storing a permanent record of the data elements, a cache divided into at least two portions connected to the permanent record storage means, means connected to the cache for logging to the cache each transaction within the memory which causes a change to at least one data element, and means for flushing the contents of one portion of the cache to the permanent record storage means upon filling of said one portion while allowing logging to another portion of the cache to continue.

23. The data processing system of claim 22 wherein the permanent record storage means comprises an erasable medium, and means for recording data on the medium reflecting the contents of said one portion of the cache.

24. The data processing system of claim 19 wherein the linking pointer lists include at least two reciprocal linking pointer lists of data elements of at least two different entity fields with related data elements, and the system further comprises means for retrieving data elements from entity fields associated by the reciprocal linking pointer lists by way of a concatenation of at least two of the reciprocal linking pointer lists, thereby allowing retrieval of all data elements from entity fields associated by the reciprocal linking pointer lists and related to a chosen data element of an entity field associated by the reciprocal linking pointer lists.

25. The data processing system of claim 24 further comprising means for checking the integrity of the linked lists including means for comparing the sum of the first and next pointer index element addresses with the sum of the last and previous pointer index element addresses within each linked list.

26. The data processing system of claim 24 further comprising means for providing a backup record of the data elements including a permanent record storage means for storing a permanent record of the data elements, a cache divided into at least two portions connected to the permanent record storage means, means connected to the cache for logging to the cache each transaction within the memory which causes a change to at least one data element, and means for flushing the contents of one portion of the cache to the permanent record storage means upon filling of said one portion while allowing logging to another portion of the cache to continue.

27. The data processing system of claim 26 wherein the permanent record storage means comprises an erasable medium, and means for recording data on the medium reflecting the contents of said one portion of the cache.

28. The data processing system of claim 24 further comprising means for continuous revision within a known upper limit of time set by the rate of the ongoing operation, including means for adding data elements to the entity-relation database whereby the data elements reflecting each selected parameter are arranged into the entity field of the data elements reflecting the selected parameter and related data elements reflecting a common parameter with at least some of the data elements are included in at least one additional entity field, means for deleting data elements from the entity-relation database, means for revising the linking pointer lists upon addition and deletion of data elements, including means for revising the pointer indexes, means for revising the linked lists upon addition and deletion of data elements so that the head portion of each linked list contains an address within the memory for the first pointer index element and an address for the last pointer index element, and the continuation portion of each linked list contains the address for each next pointer index element and each previous pointer index element, and means for revising the binary sort tree indexes upon addition and deletion of data elements.

29. The data processing system of claim 28 further comprising means for checking the integrity of the linked lists including means for comparing the sum of the first and next pointer index element addresses with the sum of the last and previous pointer index element addresses within each linked list.

30. The data processing system of claim 29 further comprising means for providing a backup record of the data elements including a permanent record storage means for storing a permanent record of the data elements, a cache divided into at least two portions connected to the permanent record storage means, means connected to the cache for logging to the cache each transaction within the memory which causes a change to at least one data element, and means for flushing the contents of one portion of the cache to the permanent record storage means upon filling of said one portion while allowing logging to another portion of the cache to continue.

31. The data processing system of claim 30 wherein the permanent record storage means comprises an erasable medium, and means for recording data on the medium reflecting the contents of said one portion of the cache.

* * * * *